United States Patent [19]

Divoky

[11] Patent Number: 4,501,545
[45] Date of Patent: Feb. 26, 1985

[54] MANUFACTURE OF INFLATABLE ARTICLES

[75] Inventor: Ralph A. Divoky, Maple Heights, Ohio

[73] Assignee: California Ceramic Supply Co., Cleveland, Ohio

[21] Appl. No.: 471,050

[22] Filed: Mar. 1, 1983

Related U.S. Application Data

[60] Division of Ser. No. 294,288, Aug. 19, 1981, abandoned, which is a continuation of Ser. No. 99,542, Dec. 3, 1979, abandoned.

[51] Int. Cl.³ .............................................. B29H 3/04
[52] U.S. Cl. .................................. 425/275; 264/297.8; 425/269
[58] Field of Search ............................ 264/297, 297.8; 425/275, 269; D7/137; 46/87

[56] References Cited

U.S. PATENT DOCUMENTS

| D. 109,795 | 5/1938 | Brannock | D7/137 |
| D. 144,599 | 4/1946 | Tupper | D7/137 |
| D. 206,186 | 11/1966 | Wallance | D7/137 |
| 2,238,833 | 4/1941 | Tillotson | 425/275 |
| 2,373,529 | 5/1942 | Beal | 425/275 |
| 2,461,270 | 2/1949 | Habib et al. | 425/275 |
| 3,180,914 | 4/1965 | Mallenfort | 264/306 |
| 3,870,450 | 3/1975 | Graebe | 425/275 |

FOREIGN PATENT DOCUMENTS 542656  2/1977  U.S.S.R. .............................. 264/259

Primary Examiner—James Derrington
Attorney, Agent, or Firm—Porter & Bremer Co.

[57] ABSTRACT

Articles such as balloons, beach balls, and other inflatable items are manufactured by dipping a number of suitably configured forms into a bath of molten latex, leaving the forms in the bath until a desired thickness of latex has been deposited on the forms, withdrawing the forms from the latex and permitting the latex to at least partially dry, and thereafter stripping the latex from the forms. In order to produce globular inflated articles, forms of a generally globular configuration have been used. Certain forms have utilized flutes or other deviations from an entirely globular configuration, but the outermost portions of prior forms used for the manufacture of globular articles are generally spherical. The greatest diametric dimension of the forms has limited the permissible form-to-form spacing. The invention employs a number of spoon-shaped forms each having a convex surface and a concave surface. The forms are arranged such that the convex portion of one form is placed in proximity with the concave portion of another form. By this configuration and arrangement of forms, a vastly greater number of articles can be manufactured compared with conventional techniques. An alternative embodiment of the invention employs a flattened form having a relatively great number of small flutes. The alternative embodiment is considerably thinner than prior fluted forms; the forms can be positioned closer together than can conventional fluted forms.

13 Claims, 15 Drawing Figures

U.S. Patent   Feb. 26, 1985   Sheet 2 of 2   4,501,545
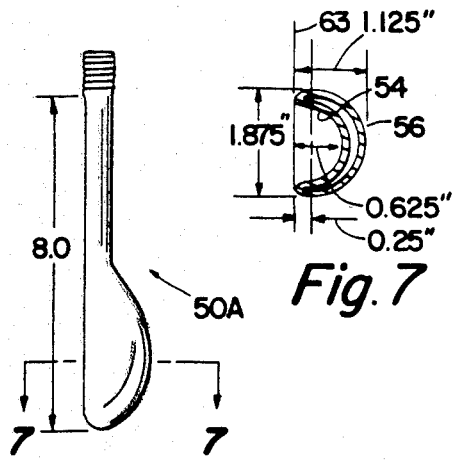
Fig. 6  Fig. 7
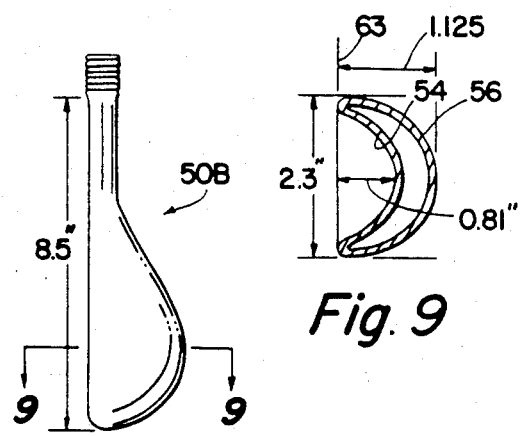
Fig. 8  Fig. 9
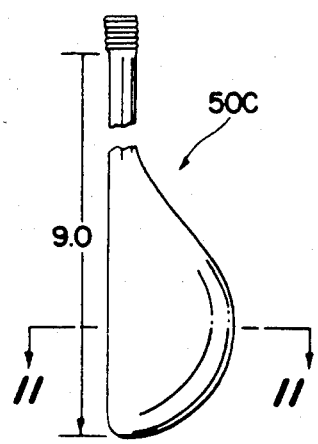
Fig. 10
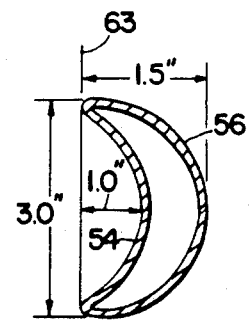
Fig. 11
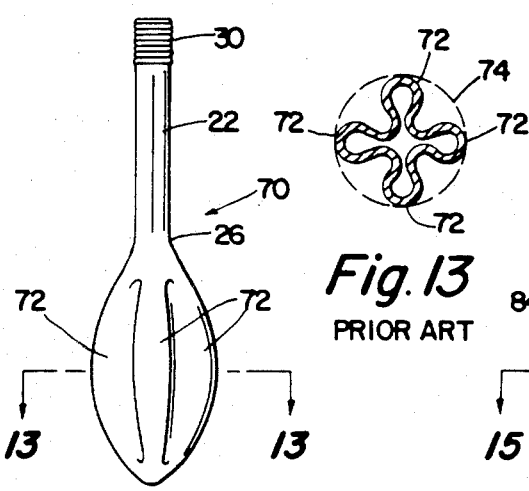
Fig. 12
PRIOR ART
Fig. 13
PRIOR ART
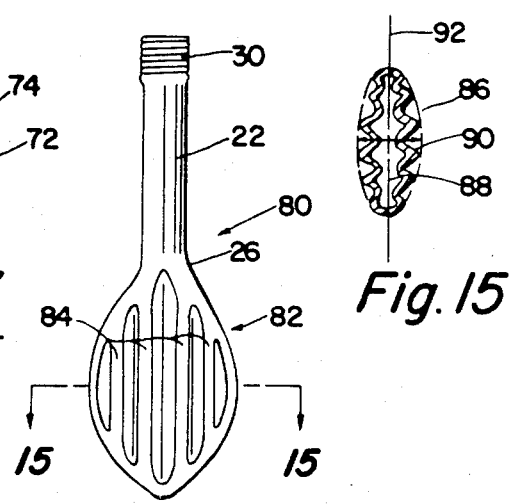
Fig. 14  Fig. 15

MANUFACTURE OF INFLATABLE ARTICLES

The present application is a division of application Ser. No. 294,288, filed Aug. 19, 1981, now abandoned, which is a continuation of application Ser. No. 99,542, filed Dec. 3, 1979, now abandoned.

BACKGROUND OF THE INVENTION

1. Field of the Invention

The invention relates to inflatable articles and, more particularly, to a method and apparatus for manufacturing globular inflatable articles such as balloons in far greater quantities than heretofore has been possible.

2. Description of the Prior Art

A popular technique for the manufacture of inflatable articles such as balloons, beach balls and so forth consists of dipping a number of suitably configured forms into a bath of molten latex. Typically, a number of forms are suspended from the underside of a carrier. The forms are cleaned, coated with a coagulant and/or stripping agent such as talc or soapstone, dipped into a bath of molten latex, removed from the latex after a desired thickness of latex has been deposited upon the forms, dried at least partially after removal from the latex bath, and stripped of solidified or semi-solidified latex. All of these techniques are well known in the art and do not form a part of the present invention per se.

In those cases where globular articles such as round balloons are being produced, the forms used heretofore have been provided in a variety of configurations. The simplest configuration has been that of a cylindrical stem having a spherical or semi-spherical end portion. The inflated object produced by such a form obviously conforms substantially to the exterior configuration of the form. Other forms suitable for producing globular inflated articles are known. For example, forms having flutes or globular forms having depresssions have been used. In a typical fluted form, an equal number of flutes extend radially from the longitudinal centerline of the form. The flutes are radially spaced from each other the same extent. Although the distance from the centerline to the outermost portion of the flutes may vary along the length of the stem, all of the flutes at a given axial station project outwardly from the centerline the same or nearly the same distance. Stated differently, at any plane taken through the form at right angles to the longitudinal centerline of the form, the flutes project outwardly in a radial pattern and the outermost portion of the flutes defines a circle. By this configuration, the surface area of a given form is greatly increased compared with a smooth surfaced spherical or semi-spherical form, and a large inflated article can be produced through the use of a form having relatively small exterior dimensions.

In those globular forms employing depressions rather than flutes, a number of identically shaped depressions are located equidistantly circumferentially of the form and are located at the same axial location relative to the centerline. A plane taken at any axial location perpendicular to the centerline will show (a) the depressions arranged equidistantly of the centerline, (b) the depressions shaped the same, and (c) the outermost portion of the form defining a circle or an ellipse. By suitably shaping the depressions, relatively large inflated articles of spherical or semi-spherical configuration can be produced.

Although conventional forms function well to produce inflated articles of desired shapes, a problem exists with respect to the quantity of articles which can be produced through the use of these known forms. Because the radially outermost portion of each form at any selected axial location defines a circle or an ellipse, the form-to-form spacing among a number of forms suspended from the underside of a carrier is limited by the greatest diameter of the forms. That is, the centerlines of spherical forms cannot be located any closer to each other than the greatest diameter of a given form and the centerlines of semi-spherical forms cannot be located any closer to each other, at least in adjacent rows, than the greatest diametric dimension of a given form. This has rather severely limited production capabilities in that a considerable amount of "wasted" space remains among adjacent forms secured to a carrier.

SUMMARY OF THE INVENTION

In response to the foregoing concerns, the present invention provides a new and improved method and apparatus for manufacturing inflated articles such as balloons and, more particularly, to a new and improved configuration and arrangement of forms. Essentially, forms according to the invention include a stem having a spoon-shaped end portion. Each end portion has both a convex surface and a concave surface. The forms are arranged such that the convex portion of one form is placed in proximity with the concave portion of another form. The centerline-to-centerline distance of adjacent forms thus is considerably less than is possible with conventional forms. Accordingly, a far greater number of forms can be secured to a given carrier than is the case with conventional forms, and yet articles identical in inflated shape to articles produced by conventional forms will result. Depending upon the size of the forms being used, production can be increased on the order of 30-60 percent. Production benefits are greater in larger-sized forms.

In an alternative embodiment of the invention, a flattened form having a relatively great number of small flutes is employed. At any plane taken perpendicular to the centerline of the form, the outermost portion of the flutes generally defines an ellipse. The major axis of the ellipse is considerably longer than the minor axis of the ellipse so that a form having relatively flat sides is produced. In effect, the resultant form is considerably thinner than prior fluted forms, but the greater number of smaller flutes has a surface area equal to the smaller number of larger flutes. The net result is that a greater number of fluted forms can be positioned adjacent each other than heretofore has been possible and, like the first-mentioned embodiment, a significant increase in production is brought about. These advantages and a fuller understanding of the invention described and claimed in the present application may be had by referring to the following description and claims, taken in conjunction with the accompanying drawings.

BRIEF DESCRIPTION OF THE DRAWINGS

FIG. 6 is another view of the form of FIG. 2;

FIG. 7 is a view taken along a plane indicated by 7—7 in FIG. 6;

FIG. 8 is a view of a larger form than that shown in FIG. 6;

FIG. 9 is a view taken along a plane indicated by line 9—9 in FIG. 8;

FIG. 10 is a view of a larger form than that shown in FIG. 8;

FIG. 11 is a view taken along a plane indicated by line 11—11 in FIG. 10;

FIG. 12 is a view of a typical prior art fluted form;

FIG. 13 is a view taken along a plane indicated by line 13—13 in FIG. 12;

FIG. 14 is a view of a fluted form according to the invention; and,

FIG. 15 is a view taken along line 15—15 in FIG. 14.

DESCRIPTION OF THE PREFERRED EMBODIMENT

Figure 1:
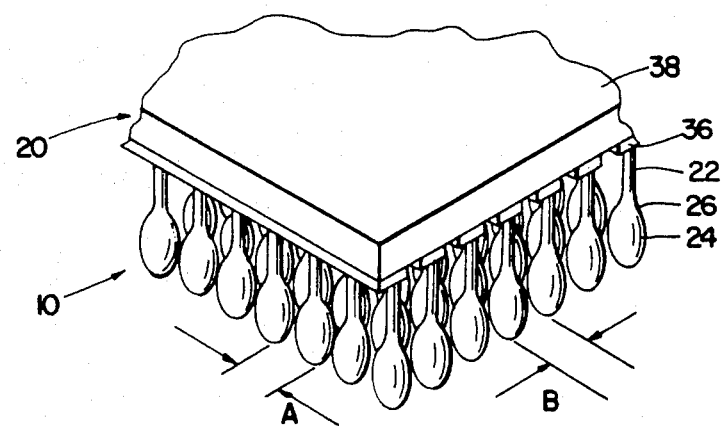
FIG. 1 is a perspective view of a prior art arrangement of balloon-making forms in which a number of globular forms are secured to the underside of a carrier.
Figure 5:
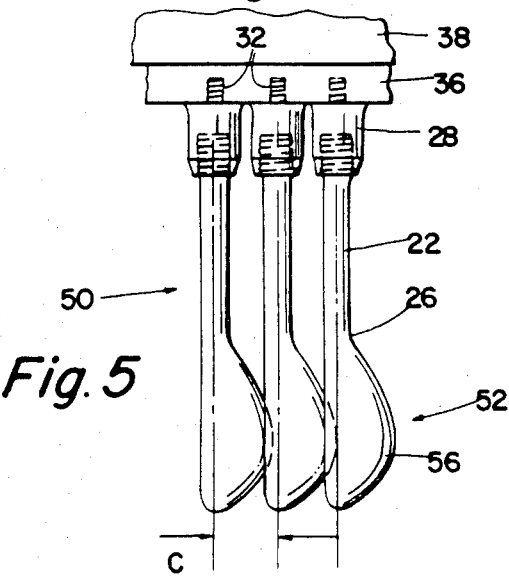
FIG. 5 is a side elevational view, partly in section, of a number of forms according to the invention suspended from the underside of a carrier and showing the form-to-form spacing.

Referring to FIG. 1, a number of globular forms 10 are suspended from the underside of a carrier 20. Each form 10 includes an elongate, cylindrical stem 22 having a semi-spherical end portion 24 connected to the stem 22 by a smoothly contoured portion 26. In one known embodiment, the greatest diameter of the end portion 24 is about 1.75 inches and the stem 22 is about 0.5 inches in diameter. The forms 10 are made of ceramic material having a glazed outer surface. Referring also to FIG. 5, a typical form-mounting technique includes a ceramic receptacle 28 into which a threaded end 30 of the stem 24 can be inserted. A threaded fastener 32 projects from the other end of the receptacle 28 and is insertable into threaded openings 34 included as part of an aluminum strip 36. A number of the strips 36 are secured to the underside of a backing member 38. One known arrangement employs 15 strips, each 30 inches long, secured to a backing member 38.

Taken together, the receptacles 28, the strips 36, and the backing member 38 define the carrier 20. In a typical arrangement, the strips 36 are secured to the backing member 38 in parallel alignment with each other. The openings 34 are located in the strip 36 such that they are separated an axial distance (A), for example 2.25 inches, as indicated in FIG. 1, and the strips 36 are spaced laterally of each other such that the openings 34 are spaced a distance (B), for example 3.0 inches, as indicated in FIG. 1. By this arrangement of the openings 34, a rectangular array of forms 10 is created. With many carriers 20, the lateral spacing of the strips 36, and hence the openings 34 (dimension B), cannot be changed. A number of openings 34 can be provided in each strip 36 such that dimension A can be selected appropriately for forms 10 having different diameters even if dimension B cannot be changed. In any event, the form-to-form spacing of the forms 10 is limited by the greatest diameter of the forms 10 and a great deal of inter-form space cannot be used productively.

After the forms 10 are secured to the underside of the carrier 20, the forms 10 are cleaned, coated with a coagulant and/or parting agent such as talc or soapstone, dipped into a bath of molten latex until a desired thickness of latex is created, removed from the latex bath, dried at least partially, and stripped of solidified or semi-solidified latex. All of these techniques are well known in the art and do not form a part of the present invention per se.

Referring to FIGS. 2-5, a form 50 according to the invention is shown. Where appropriate, like reference numerals will be used throughout to identify elements performing substantially identical functions. Each form 50 includes a cylindrical stem 22 having a threaded end portion 30. Unlike the forms 10, the forms 50 according to the invention include a spoon-shaped end portion 52. The spoon-shaped end portion 52 includes a concave surface 54, a convex surface 56, and, as viewed in FIG. 4, contoured transition surfaces 58, 59. The end portion 52 is connected to the stem 22 by a smoothly contoured portion 26 having an indented throat 60. At the other end the end portion 52 includes a rounded tip 61.

Figure 2:
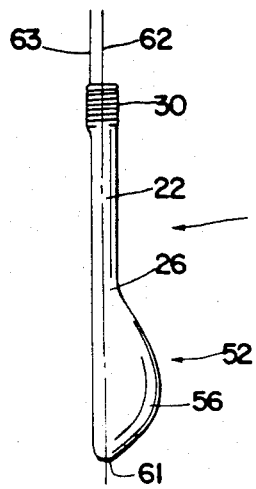
FIG. 2 is a side elevational view of a form according to the invention.
Figure 3:
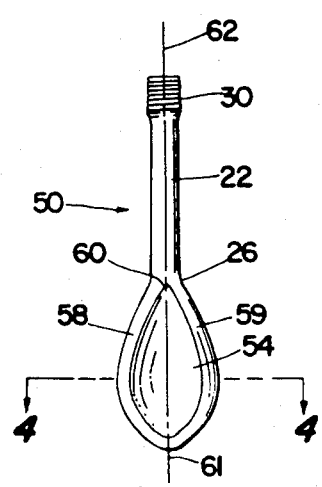
FIG. 3 is a front elevational view of the form of FIG. 2 showing a concave surface of the form.
Figure 4:
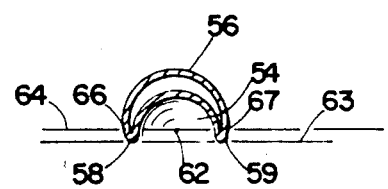
FIG. 4 is a view taken along a plane indicated by line 4—4 in FIG. 3.

Each form 50 includes a longitudinal axis or centerline 62 positioned centrally with respect to the stem 22. The outermost portion of the transition surfaces 58, 59 and an edge of the stem 22 lie in a common plane 63 as indicated in FIGS. 2 and 4. A second plane 64 is positioned parallel to the first plane 63; the longitudinal axis 62 lies in second plane 64. The intersection points between the second plane 64 and the outer surface of the stem 27, the transition portion 26, and the convex portion 56 at any axial location are identified by the numerals 66, 67. At any given plane taken perpendicular to the centerline 62 at any location axially of the centerline 62, the distance between the points 66, 67 following the exterior of the form 50 is the same, regardless of which way the exterior surface is traversed. For example, starting from point 66 as is illustrated in FIG. 4 and proceeding clockwise, the distance from point 66 to point 67 along the exterior of the convex surface 56 is the same as the distance from point 67 to point 66 proceeding from the exterior of the transition portion 59, to the concave portion 54, and then to the other transition portion 58. Stated differently, the plane 64 divides the form 50 into two sections having equal surface areas and equal peripheral dimensions at every axial location. Moreover, because all exterior surfaces of the end portion 52 are contoured smoothly from the contoured portion 26 to the tip 61, an article produced by the form 50 will be spherical or semi-spherical in an inflated condition.

Referring to FIG. 5, the forms 50 are arranged with respect to each other such that their centerlines 62 are spaced a distance (C). In this arrangement, at least a portion of the convex surface 56 of one form 50 is located in proximity with the concave surface 54 of another form 50. Stated differently, a portion of the exterior surface 56 of one form 50 breaks the plane 63 of another form 50 and nests at least partially within the volume defined by the concave surface 54 and the transition surfaces 58, 59.

Referring to FIGS. 6-11, the dimensional relationship among differently sized forms 50 is illustrated. The form 50A illustrated in FIGS. 6 and 7 is substantially identical to that illustrated in FIG. 2, except that appropriate dimensions have been given. The form 50A is of an equivalent size compared with the forms 10, that is, an article produced by use of the form 50A will be the same size and shape as an article produced by use of one of the forms 10. The only difference in the resultant articles is that an article produced by use of the form 50A will be spoon-shaped in an uninflated condition while an article produced by use of forms 10 will be round in an uninflated condition. Upon inflation, the articles are identical. The length of the form 50A, from the transition with the threaded portion 30 to the rounded tip 61 is approximately 8.0 inches. The greatest width of the form 50A is approximately 1.875 inches. The greatest depth of the form 50A, measured from the plane 63 to the furthest removed portion of the convex surface 56 is approximately 1.125 inches. The greatest depth of the form 50A measured from the plane 63 to the most-removed portion of the concave surface 54 is approximately 0.625 inch. The planes 63, 64 are spaced approximately 0.25 inch.

Referring again to FIG. 1, a typical dimension A for globular forms having a maximum end portion diameter of 1.75 inches would be approximately 2.25 inches. If the forms 10 are spaced in this manner along the lenght of a strip 36, 13 such forms can be carried by any one strip 36. Using the forms 50A according to the invention, a typical centerline distance would be approximately 1.33 inches, or about 21 forms 50A can be carried by any one strip 36. Accordingly, about twice the number of the forms 50A can be secured to a strip 36 in the same axial distance as can equivalently size forms 10. Without making any other changes in the method of manufacture except substitution of the forms 50A, production can be increased by up to 60 percent.

The forms illustrated in FIGS. 8–11 are similar to the form 50A illustrated in FIGS. 6 and 7, although the proportions vary somewhat. In the embodiment illustrated in FIGS. 8 and 9, the length of the form 10 is approximately 8.5 inches, its greatest width is approximately 2.3 inches, the greatest distance from the convex surface 54 to the plane 63 is approximately 1.25 inches, and the greatest distance from the concave surface 56 to the plane 63 is approximately 0.81 inch. The dimension C separating forms 50B is approximately 1.5 inches. Referring to the form 50C illustrated in FIGS. 10 and 11, the overall length of the form is approximately 9.0 inches, the greatest width of the form is approximately 3.0 inches, the greatest distance from the plane 63 to the convex surface 56 is approximately 1.5 inches, and the greatest distance from the plane 63 to the concave surface 54 is approximately 1.0 inch. The forms 50C when assembled as illustrated in FIG. 5 have a typical centerline spacing C of approximately 1.5 inches. Using the forms 50C production can be increased approximately 60 percent compared with equivalently sized forms 10.

Referring now to FIGS. 12–15, a typical prior art form 70 having flutes 72 is shown. As in the forms referred to previously, the form 70 includes a cylindrical, elongate stem 22 having a threaded end portion 30. The flutes 72 are rounded at their extremities and are joined to the stem 22 by a smoothly contoured surface 26. At any axial location, the outer diameter of the flutes 72 defines a circle illustrated by the dotted line 74. Because the flutes 72 are the same size and are spaced the same radial distance, an article produced by the form 70 will be spherical or semi-spherical. Although the diameter of the circle 74 is smaller than the diameter of a globular form 10 needed to produce an equivalently sized article, the diameter of the circle 74 still is a limiting factor in how close the forms 70 can be placed to each other.

An alternative embodiment of the invention, and an improvement on the fluted form 70, is indicated by the numeral 80 in FIGS. 14 and 15. The form 80, like the forms referred to previously, includes an elongate, cylindrical stem 22 having a threaded end portion 30. The form 80 includes a contoured end portion 80 connected to the stem 22 by a transition portion 26. The axial extent of the contoured portion 82 is the same as that of the corresponding portion of the fluted form 70. The contoured end portion 82 includes a plurality of relatively small flutes 84 of generally the same width and depth. The flutes 84 are considerably smaller than the flutes 72 included as part of the fluted form 70.

Referring to FIG. 15, the contoured portion 82 is "flattened." The outermost portion of the flutes 84 defines an ellipse indicated by the dotted line 86. The major axis of the ellipse 86 is indicated by the line 88, and the minor axis of the 86 is indicated by the line 90. The axis 88 is considerably longer than the axis 90 such that a relatively thin end portion 82 is produced. A plane 92, indicated by extensions of the major axis 88, divides the form 80 into two sections of equal surface areas. By securing the forms 80 to the strips 36 such that the major axes 88 are parallel with each other, the centerline distances between the forms 80 (represented by the spacing between the major axes 88) is approximately 1.25 inches. By contrast, the smallest practical centerline spacing between adjacent fluted forms 70 is approximately 2.5 inches. As with the first-mentioned embodiment of the invention described above, an approximate 50 percent increase in production capacity is made possible.

Although the invention has been described in its preferred embodiment with a certain degree of particularity, it will be understood that the present disclosure of the preferred embodiment has been made only by way of example and that numerous changes in the details of construction and the combination and arrangement of components may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A balloon-making form, comprising:
  (a) an elongate, cylindrical stem configured at one end for attachment to a carrier;
  (b) a generally spoon-shaped end portion formed at the end of the stem removed from the configured end portion, the spoon-shaped end portion including:
    (i) a convex surface;
    (ii) a concave surface;
    (iii) smoothly contoured transition surfaces connecting the concave and convex surfaces;
    (iv) a rounded tip; and
    (v) a smoothly contoured portion connecting the spoon-shaped end portion to the stem;
  (c) a longitudinal axis extending centrally of the stem;
  (d) the transition surfaces and at least one edge of the stem lying in a first plane spaced from the longitudinal axis; and
  (e) a second plane, parallel to the first plane, being coincident with the longitudinal axis and defining a line of intersection with the convex surface, the smoothly contoured portion, and the stem, the second plane dividing the form into two sections having equal surface areas.

2. The form of 1, wherein the end of the stem removed from the spoon-shaped end portion has threads formed thereon for attachment to a carrier.

3. The form of claim 1, wherein the overall length of the form is approximately 8.0 inches, the greatest width of the form is approximately 1.875 inches, the greatest depth of the form measured from the first plane to the furthest-removed portion of the convex surface is approximately 1.125 inches, the greatest depth of the form measured from the first plane to the furthest-removed portion of the concave surface is approximately 0.625 inch, and the first and second planes are spaced approximately 0.25 inch.

4. A balloon-making form, comprising a stem and an end portion at one end of the stem, the end portion having a plurality of outwardly projecting flutes, the outermost portion of the flutes generally defining an ellipse, the major axis of the ellipse being approximately twice as long as the minor axis of the ellipse such that the end portion is relatively thin.

5. The form of claim 4, wherein:
   (a) a plurality of the forms are secured to a carrier in at least one row with the major axes of the forms in any given row being positioned generally parallel with each other; and
   (b) the spacing between the minor axes of adjacent forms is such that the exterior of the flutes of one form are in proximity with the exterior of the flutes of adjacent forms.

6. The form of claim 4, wherein the stem is cylindrical and the end of the stem removed from the fluted end portion is configured for attachment to a carrier.

7. An arrangement of balloon-making forms, comprising:
   (a) a carrier to which a plurality of forms may be secured; and,
   (b) a plurality of forms secured to the carrier, each form including a cylindrical stem for attachment to the carrier and a spoon-shaped portion disposed at the end of the stem, the spoon-shaped portion having a concave surface and a convex surface, the forms arranged in at least one row such that the convex portion of a given form extends into the volume defined by the concave portion of an adjacent form.

8. The arrangement of forms of claim 7, wherein the forms are attached to strips and the strips are attached to a backing member such that the strips are in parallel alignment with each other.

9. The arrangement of forms of claim 8, wherein:
   (a) each form is made of glazed ceramic material;
   (b) each form is attached to a strip by means of a threaded ceramic receptacle, the ceramic receptacles being spaced uniformly along the length of the strip;
   (c) each strip is approximately 30 inches long; and
   (d) approximately 15 strips are attached to the backing member.

10. An arrangement of balloon-making forms, comprising:
    (a) a carrier to which a plurality of forms may be secured;
    (b) a plurality of forms secured to the carrier, each form including an elongate, cylindrical stem configured at one end for attachment to the carrier, a generally spoon-shaped end portion formed at the end of the stem removed from the configured end portion, the spoon-shaped end portion including a convex surface, a concave surface, smoothly contoured transition surfaces connecting the concave and convex surfaces, a rounded tip, and a smoothly contoured portion connecting the spoon-shaped end portion to the stem, the forms also including a longitudinal axis extending centrally of the stem, the transition surfaces and at least one edge of the stem lying in a first plane spaced from the longitudinal axis, and a second plane, parallel to the first plane, being coincident with the longitudinal axis and defining a line of intersection with the convex surface, the smoothly contoured portion, and the stem, the second plane dividing the form into two sections have equal surface areas; and
    (c) the forms being arranged in at least one row such that the convex portion of a given form is in proximity with the concave portion of an adjacent form.

11. The arrangement of forms of claim 10, wherein the end of the stem removed from the spoon-shaped end portion has threads formed thereon for attachment to the carrier.

12. The arrangement of forms of claim 10, wherein the forms are attached to strips and the strips are attached to a backing member such that the strips are in parallel alignment with each other.

13. The arrangement of forms of claim 12, wherein:
    (a) each form is made of glazed ceramic material;
    (b) each form is attached to a strip by means of a threaded ceramic receptacle, the ceramic receptacles being spaced uniformly along the length of the strip;
    (c) each strip is approximately 30 inches long; and
    (d) approximately 15 strips are attached to the backing member.

* * * * *